(12) United States Patent
Amamori (10) Patent No.: US 6,336,661 B1
(45) Date of Patent: Jan. 8, 2002

(54) AIRBAG APPARATUS AND CASING THEREOF

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/637,706

(22) Filed: Aug. 15, 2000

(30) Foreign Application Priority Data

Aug. 27, 1999 (JP) ............................................ 11-241772

(51) Int. Cl.[7] .............................................. B60R 21/16
(52) U.S. Cl. ................................................... 280/743.1
(58) Field of Search .......................... 280/743.1, 728.1, 280/728.2, 732, 743.2, 739

(56) References Cited

U.S. PATENT DOCUMENTS 5,603,526 A * 2/1997 Buchanan .................. 280/737

FOREIGN PATENT DOCUMENTS

JP           6-2216      *  6/1994

* cited by examiner

Primary Examiner—Christopher P. Schwartz
Assistant Examiner—C. T. Bartz
(74) Attorney, Agent, or Firm—Kanesaka & Takeuchi (57) ABSTRACT

An airbag apparatus is formed of a casing having an opening at an upper part thereof and a side portion, an airbag accommodated in and coupled with the casing, a gas generator for supplying a gas into the airbag and deploying the airbag, and a lid for covering the opening. A thick plate may be formed independently and attached to casing, or formed integrally with the casing. The thick plate has a thickness greater than that of the casing, and includes an upper portion and a lower portion extending from the upper portion. The lower portion and the side portion of the casing secured thereto project outwardly of the casing to be deformed easily when a force is applied thereto.

10 Claims, 9 Drawing Sheets

AIRBAG APPARATUS AND CASING THEREOF

BACKGROUND OF THE INVENTION AND RELATED ART STATEMENT

The present invention relates to an airbag apparatus, and more particularly, to an airbag apparatus which is preferably applicable to a passenger side airbag apparatus installed in the instrument panel of a vehicle. More specifically, the present invention relates to an airbag apparatus having a casing with a thick plate portion. Further, the present invention relates to a casing used in the airbag apparatus.

There is known an airbag apparatus, wherein a thick plate is attached to a casing, and a lid is locked to hook members of the thick plate, as a passenger-side airbag apparatus.

Figure 9:
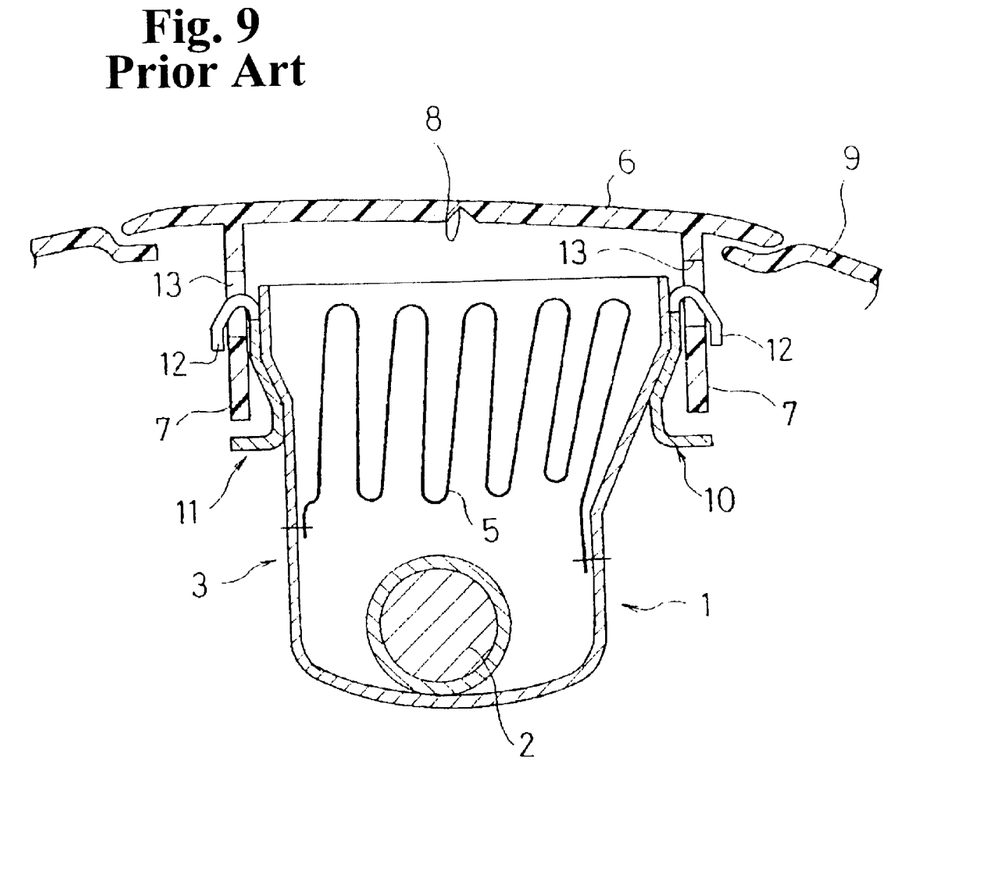
FIG. 9 is a sectional view of a conventional airbag apparatus.

FIG. 9 is a sectional view showing a conventional airbag apparatus. The airbag apparatus 1 is composed of an inflator 2 for generating a gas in a collision of a vehicle and the like, a casing 3 for accommodating the inflator 2, an airbag 5 accommodated in the casing 3 in a folded state, and a lid 6 for closing an uncovered opening at the upper portion of the casing 3. The airbag apparatus 1 is attached to an instrument panel 9. Thick plates 10 and 11 are secured to upper outer surfaces of the casing 3 by spot welding. The thick plates 10 and 11 extend along upper edges of the casing 3, and a plurality of pawl-shaped hook members 12 is disposed integrally with the thick plates 10 and 11 in the extending direction thereof at appropriate intervals. The legs 7 of the lid 6 have openings 13 corresponding to the hook members 12 to engage therewith. A thin wall section 8 is formed on the inner surface of the lid 6.

When the lid 6 is mounted on the casing 3 to assemble the airbag apparatus 1, the lid 6 is pushed so as to close the uncovered opening of the upper surface of the casing 3. With this operation, the legs 7 of the lid 6 pass over the hook members 12 while being elastically deformed externally, and return to their original shapes when the hook members 12 are in conformity with the openings 13, so that the hook members 12 are caught by the inner edges of the openings 13.

In the airbag apparatus arranged as described above, when the inflator 2 is actuated, the airbag 5 is deployed, and the lid 6 is broken and opened along the thin wall section 8, whereby the airbag 5 is unfolded into a compartment.

The strength required for the casing 3 can be reduced by attaching the thick plates 10 and 11 to the casing 3, and locking the lid 6 to the hook members 12 of the thick plates 10 and 11, as shown in FIG. 9. As a result, it is possible to reduce the wall thickness of the casing 3 and to decrease the weight of the casing 3.

Incidentally, an instrument panel of a vehicle must have a energy absorbing function for absorbing energy generated when a passenger hits thereto in such a manner that the instrument panel is gradually deformed. The casing and the lid of the passenger side airbag apparatus which is installed in the instrument panel also must have the energy absorbing function.

Japanese Utility Model Publication (KOKAI) No. 6-22116 discloses that a bent section with an approximately V-shape in a cross section is disposed on a side surface of a casing, and the casing is deformed at the bent section when a passenger hits the airbag apparatus.

An object of the present invention is to provide an airbag apparatus having an energy absorbing function which is more enhanced than that disclosed in Japanese Utility Model Publication No. 6-22116 and a casing of the airbag apparatus.

SUMMARY OF THE INVENTION

In a first aspect of the invention, an airbag apparatus comprises a casing, a front surface of which is arranged as an uncovered opening, an airbag accommodated in and coupled with the casing, a gas generator for supplying a gas into the airbag and deploying the airbag, a thick plate secured to a side surface of the casing, and a lid for covering the uncovered opening. In the airbag apparatus, at least a rear or lower side portion of the thick plate is secured to a side surface or portion of the casing, and the rear side portion of the thick plate and a portion of the side surface of the casing secured to the rear side portion of the thick plate project outwardly.

In a second aspect of the present invention, an airbag apparatus comprises a casing, a front surface of which is arranged as an uncovered opening, an airbag accommodated in and coupled with the casing, a gas generator for supplying a gas into the airbag and deploying the airbag, and a lid for covering the uncovered opening. In the airbag apparatus, a front or upper portion, which is near the uncovered opening, of a side surface section of the casing is composed of a thick plate, the thickness being greater than a rear or lower portion of the side surface section, and the rear portion is composed of a thin plate. A rear or lower side of the thick plate and a portion, which is continuous to the rear side, of the thin plate project outwardly of the casing.

In a third aspect of the invention, a casing of an airbag apparatus for accommodating an airbag includes an uncovered opening at a front surface or upper portion of the casing, and a thick plate is disposed on a side surface of the casing along an edge of the uncovered opening. In the casing, at least a rear or lower side portion of the thick plate is secured to a side surface or portion of the casing, and the rear side portion of the thick plate and a portion of the side surface of the casing secured to the rear side portion of the thick plate project outwardly.

In a fourth aspect of the invention, a casing of an airbag apparatus for accommodating an airbag includes an uncovered opening at a front surface or upper portion of the casing. In the casing, the upper portion, which is near the uncovered opening, of a side surface section of the casing is composed of a thick plate whose thickness is greater than a rear or lower portion of the side surface section, and the rear portion is composed of a thin plate. The rear side portion of the thick plate and a portion continuous to the rear side portion of the thin plate project outwardly of the casing.

In the casing and the airbag apparatus using the casing of the present invention, when a passenger hits the casing or the airbag apparatus, the rear or lower side portion of the thick plate is deformed and project outwardly. At the time, the portion of the casing continuous to the thick plate is deformed so as to be drawn externally, whereby an energy is absorbed.

It is preferable that the rear side portion of the thick plate is bent obliquely relative to a portion located above the rear side portion.

In the present invention, the casing is composed of metal or a synthetic resin.

DETAILED DESCRIPTION OF PREFERRED EMBODIMENTS

Embodiments of the invention will be described below with reference to the drawings.

Figure 1:
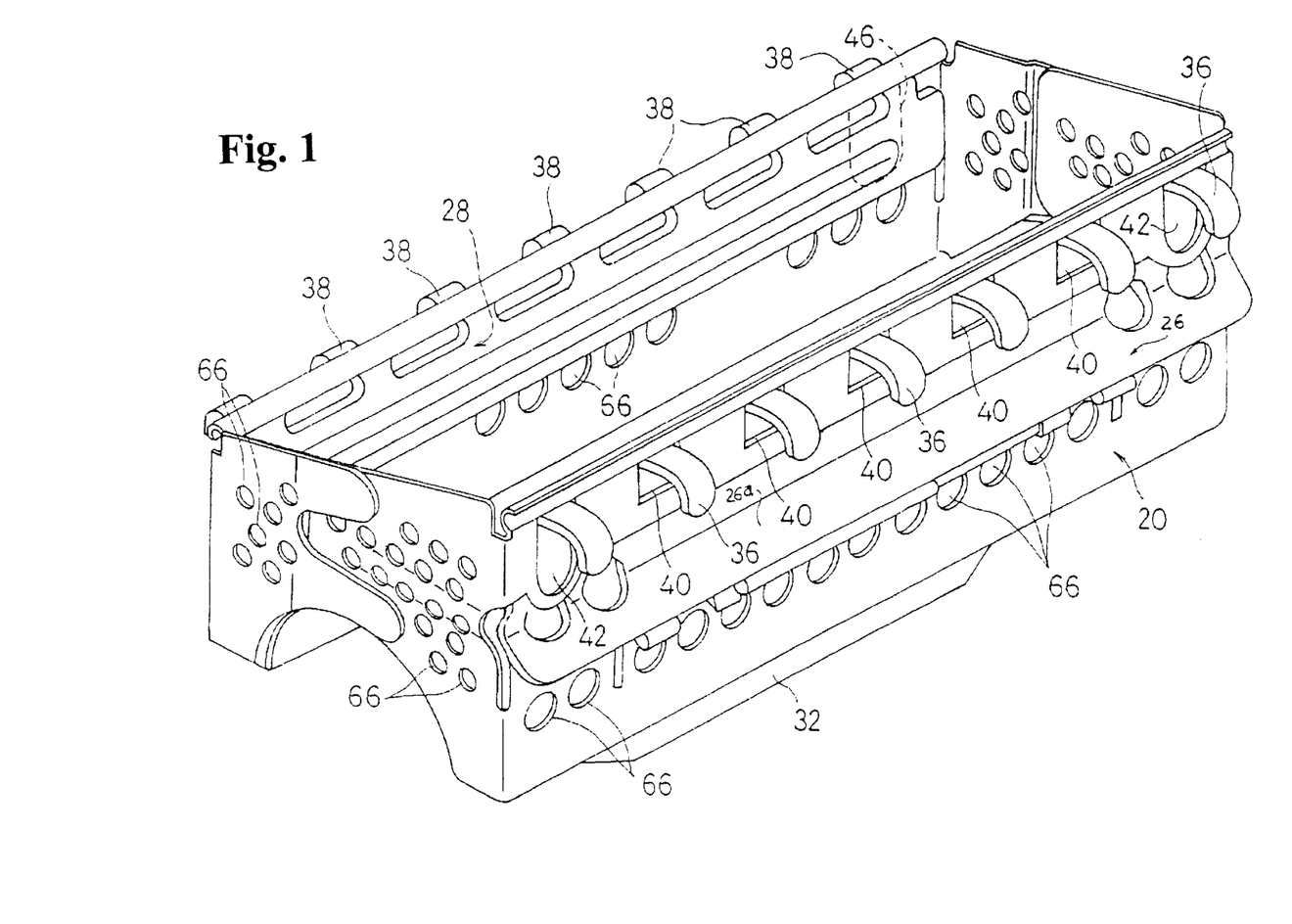
FIG. 1 is a perspective view of a casing of an airbag apparatus according to one embodiment of the invention.
Figure 2:
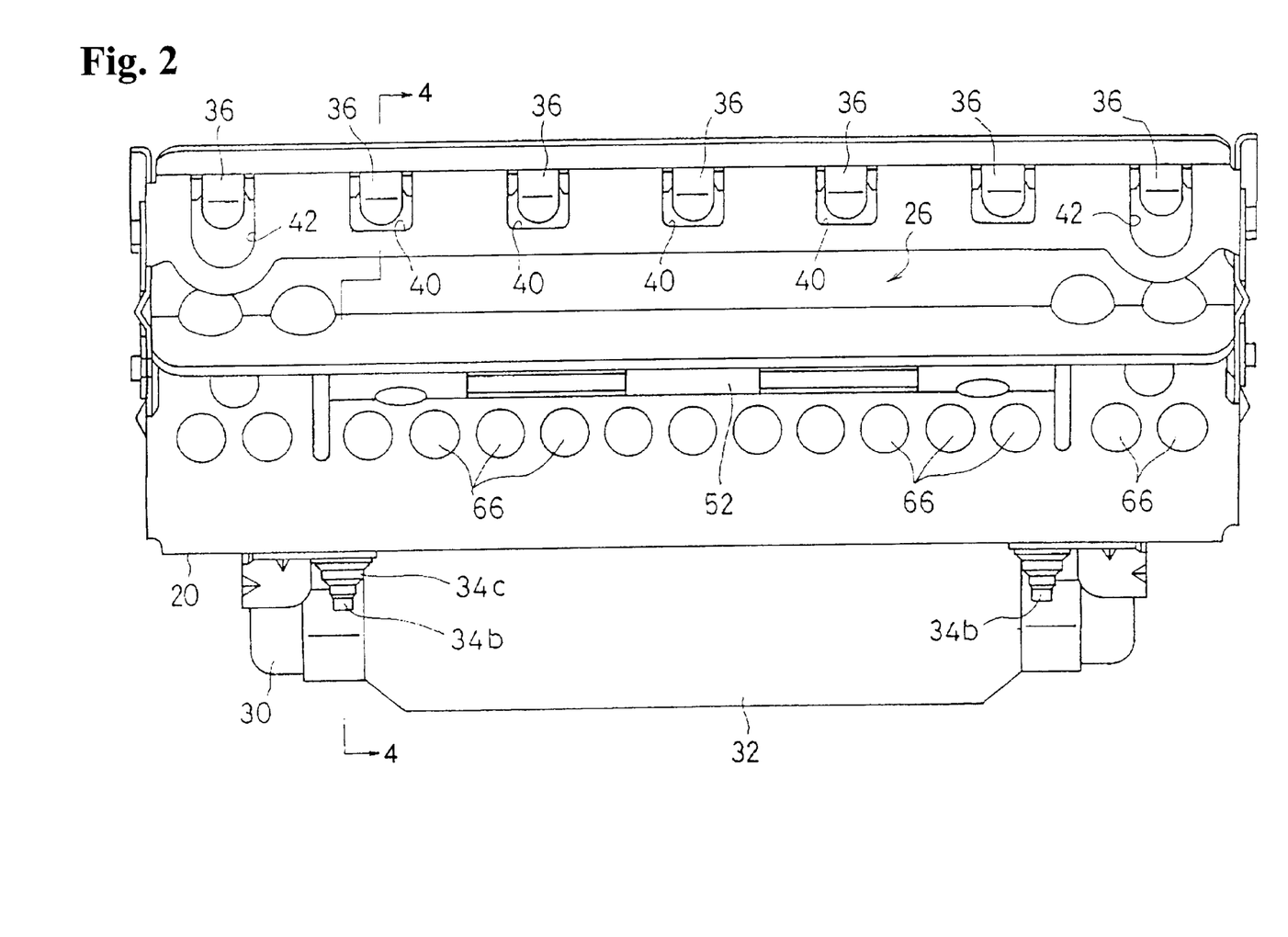
FIG. 2 is a front view of the casing of the airbag apparatus according to the invention.
Figure 3:
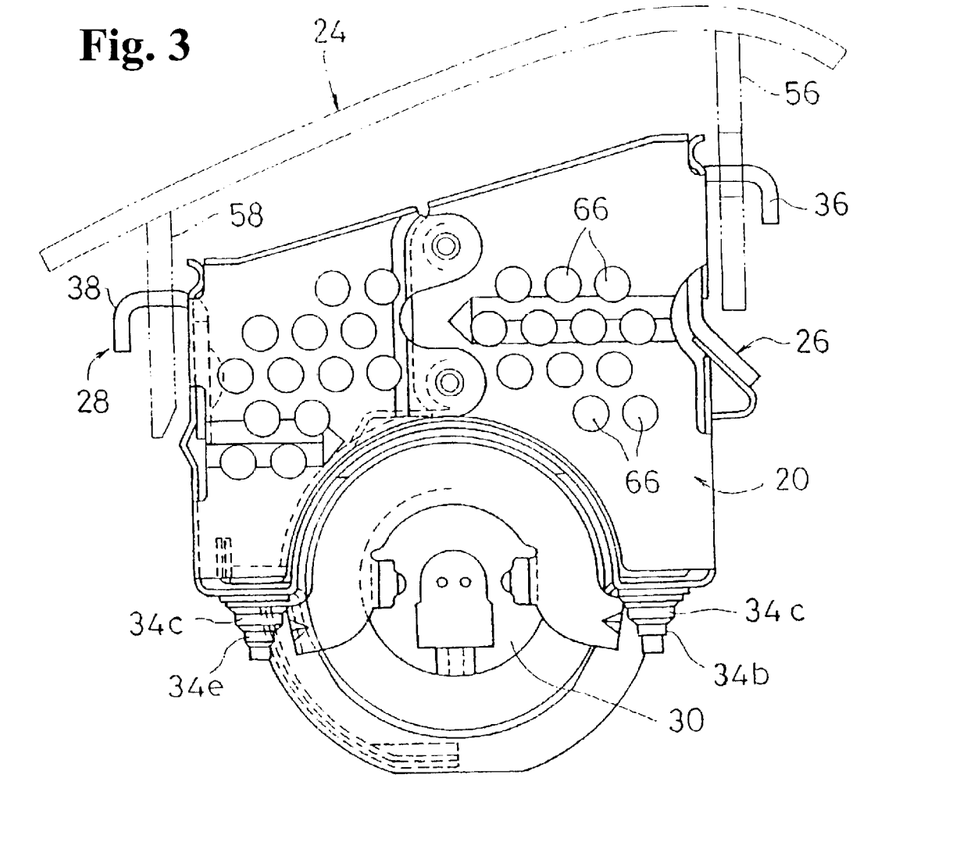
FIG. 3 is a side view of the casing of the airbag apparatus according to the invention.
Figure 4:
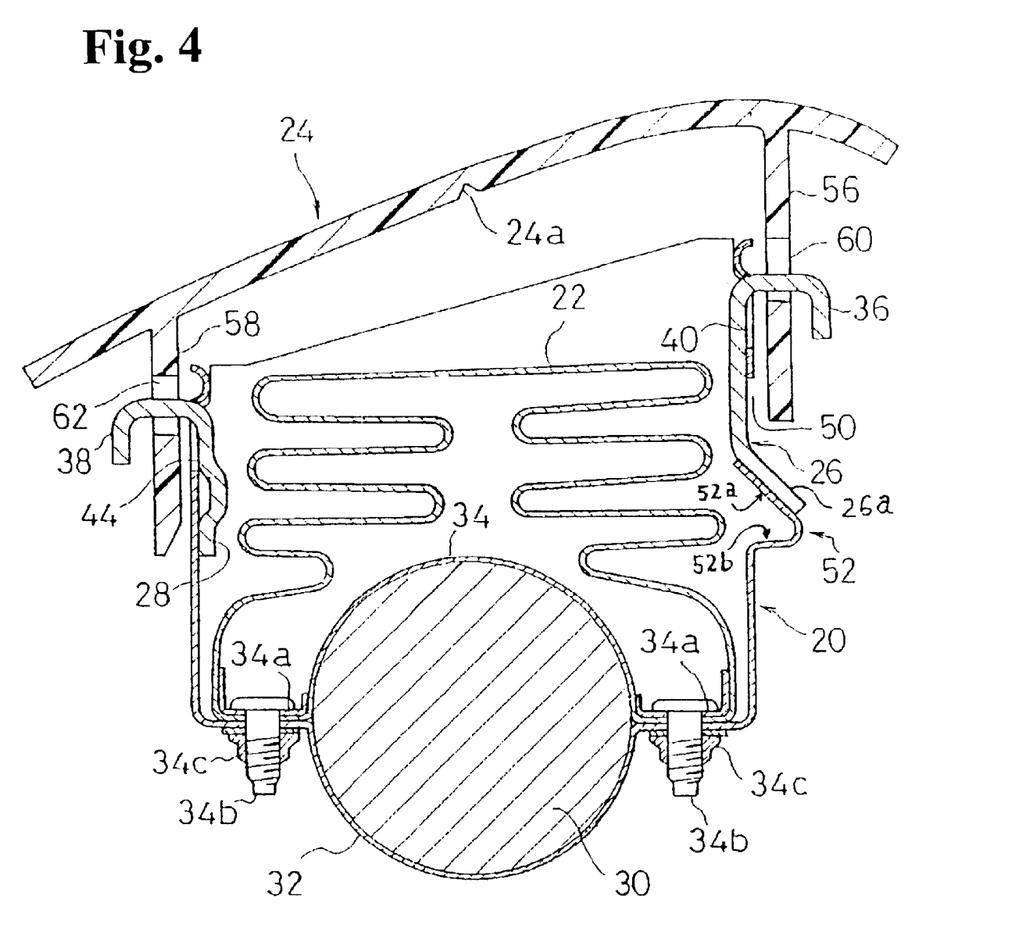
FIG. 4 is a sectional view taken along ling 4—4 in FIG. 2.
Figure 5:
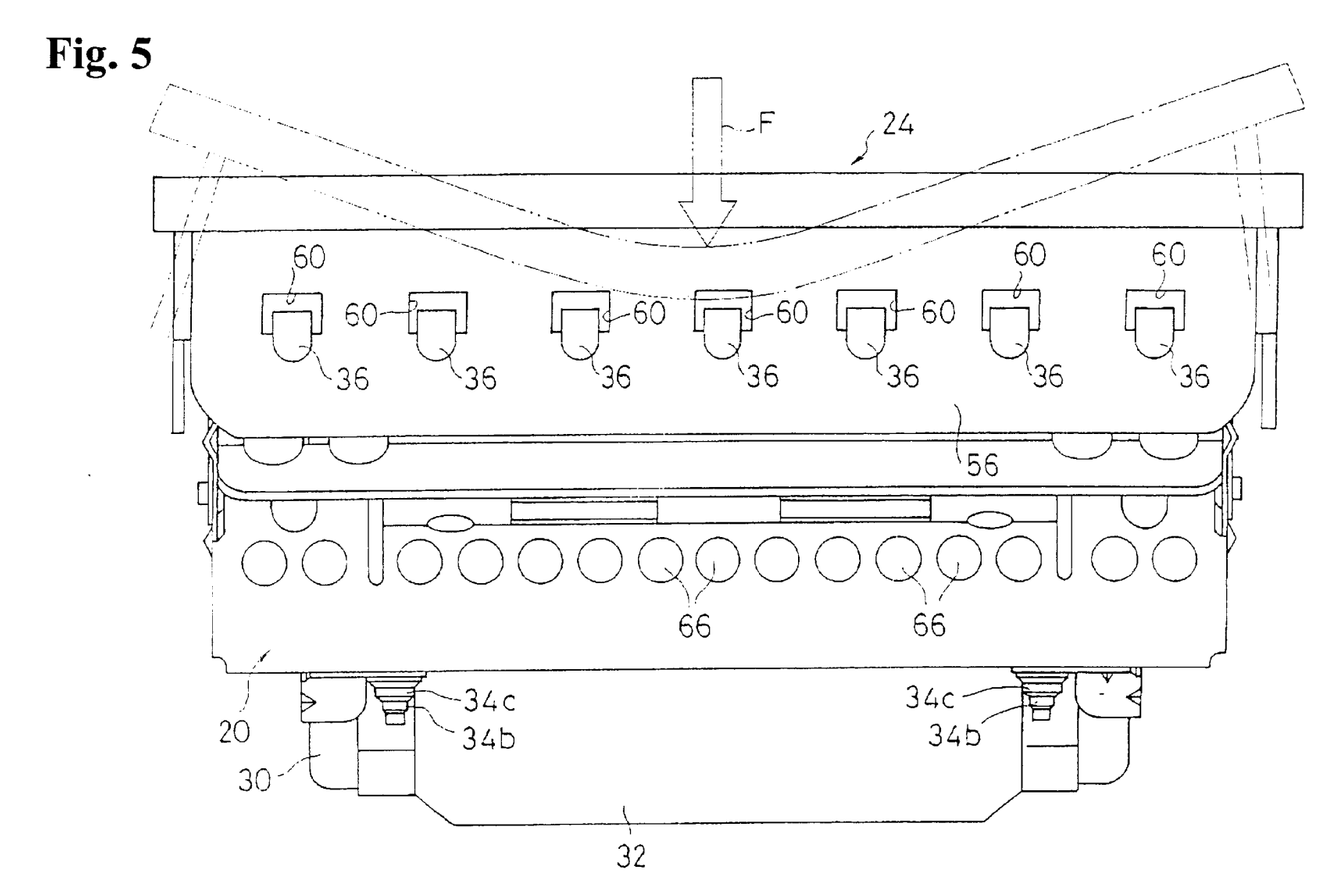
FIG. 5 is a front view of the airbag apparatus according to the invention.
Figure 6:
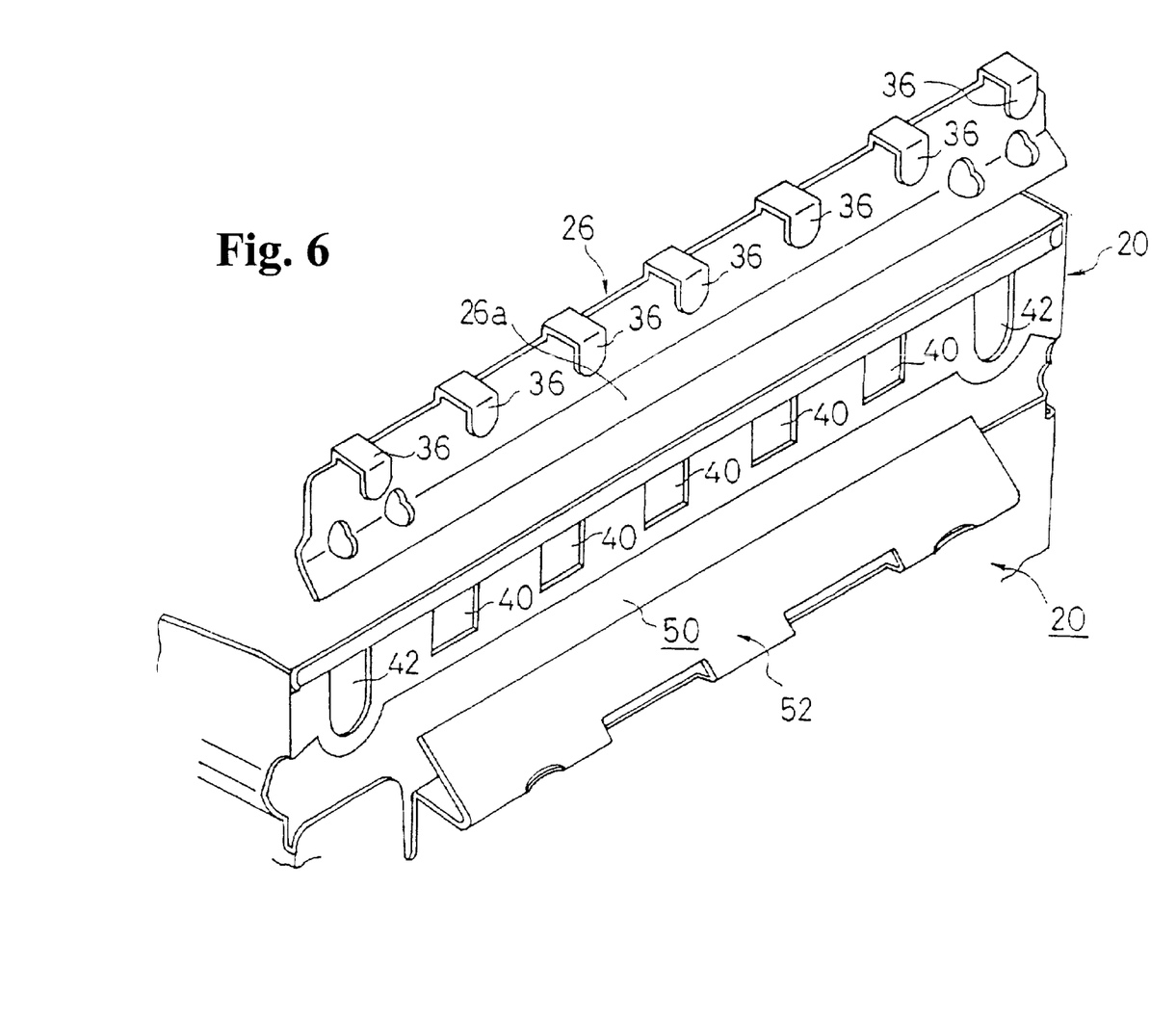
FIG. 6 is a perspective view showing the casing of the airbag apparatus and a thick plate according to the invention.
Figure 7:
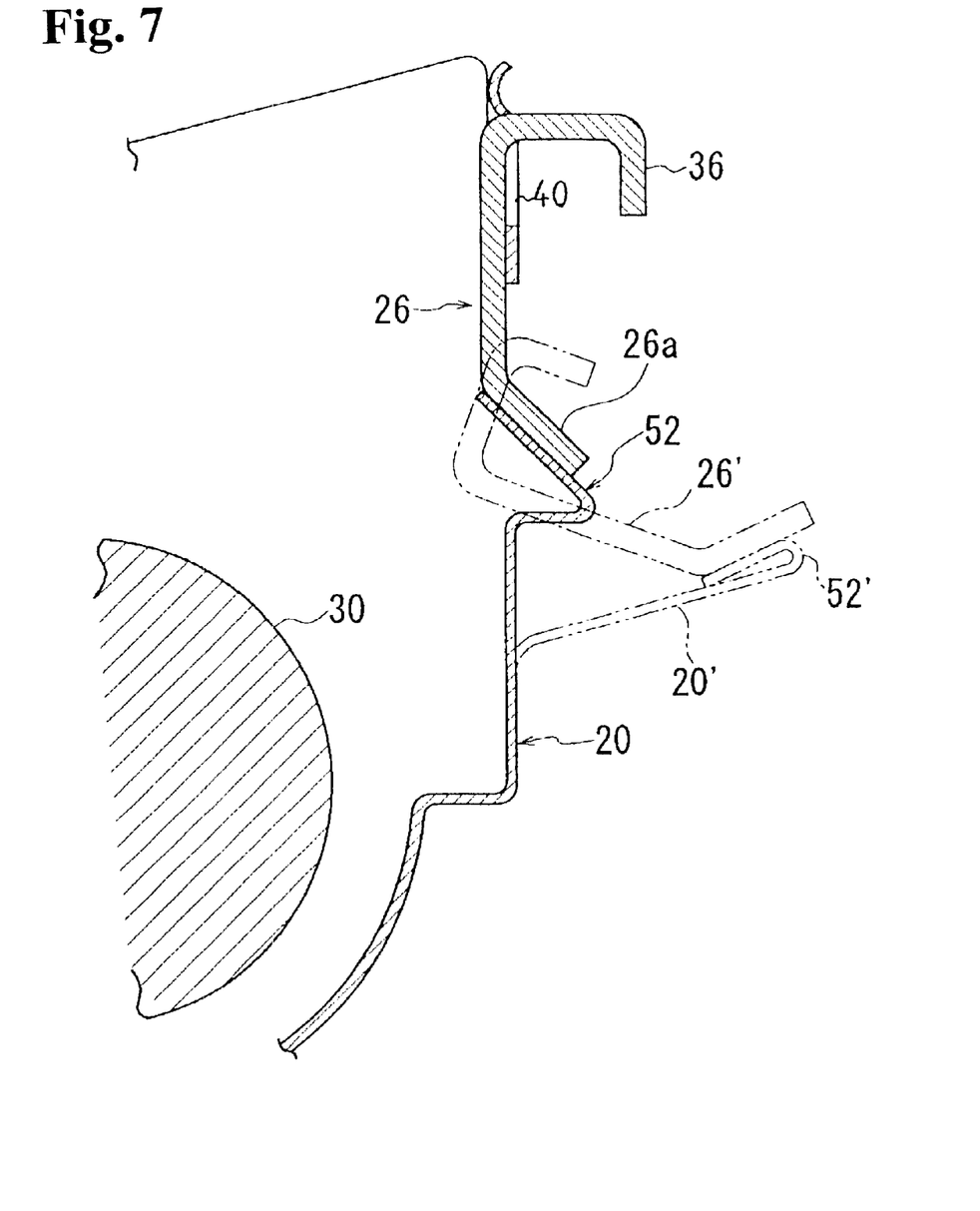
FIG. 7 is a sectional view showing how the casing is deformed.

FIG. 1 is a perspective view of a casing according to an embodiment; FIG. 2 is a front view of FIG. 1; FIG. 3 is a side view of FIG. 1; FIG. 4 is a sectional view taken along line 4—4 in FIG. 2; FIG. 5 is a front view of the airbag apparatus according to the embodiment; FIG. 6 is a perspective view showing a thick plate and an upper portion of the casing; and FIG. 7 is a sectional view showing how the casing is deformed.

The passenger side airbag apparatus according to the embodiment includes a casing 20 having an approximately rectangular shape when viewed in a plane, an airbag 22 folded and disposed in the casing 20, a lid 24 for covering an uncovered or upper opening on the upper surface side of the casing 20, thick plates 26 and 28 for coupling the lid 24 with the casing 20, and an approximately columnar inflator 30 for generating a gas for deploying the airbag 22.

The thick plates 26 and 28 are secured to the side surfaces, which extend in a vehicle width direction, of the casing 20 by spot welding. The thick plate 26 is disposed on the side of a seat, whereas the thick plate 28 is disposed on the side of the window shield.

The casing 20 and the thick plates 26 and 28 are made of steel, for example, a plated steel sheet or the like. When the thick plates 26 and 28 and the casing 20 are composed of the same type of a steel member, the thickness of each of the thick plates 26 and 28 is set to at least 1.6 times greater than that of the casing 20, e.g. about 1.6 to 3 times greater that of the casing 20.

A semi-arc-shaped enlarged section 32 projects from the bottom of the casing 20, and the inflator 30 is engaged with the enlarged section 32 and covered with a press member 34 from an upper side (FIG. 4). The press member 34 includes flanges 34a which overlap the bottom surface of the casing 20, and the edge portion of the gas introduction port of the airbag 22 is held between the flanges 34a and the bottom surface of the casing 20. The flanges 34a are secured to the casing 20 by bolts 34b and nuts 34c.

The thick plates 26 and 28 extend along the upper edges of the casing 20 in the vehicle width direction. The thick plates 26 and 28 are mostly disposed in the casing 20 and secured to the casing 20 by spot welding. It is sufficient that each thick plate is spot welded at 2 to 4 positions, e.g. 3 positions (excluding welding portions between the lower portion 26a of the thick plate 26 and a bent section 52, which will be described later).

Approximately L-shaped hook members 36 and 38 extend externally from the upper sides of the thick plates 26 and 28. Openings 40 and 42 having the number same as that of the hook members 36 are formed in the side surface, which extend in the vehicle width direction, on one side (right side of FIGS. 1, 3 and 4) of the casing 20, whereas openings 44, 46 having the number same as that of the hook members 38 are formed in the side surface, which extends in the vehicle width direction, on the other side (left side in FIGS. 1, 3 and 4).

The openings 40, 42 are disposed so that the upper sides thereof have the same height. In the row of the openings 40 and 42, the openings 42 are disposed on both ends of the row, and the openings 40 are disposed between the openings 42. The length of the opening 42 in the up and down directions is greater than that of the opening 40 in the up and down directions. The hook members 36 of the thick plate 26 project externally or outwardly of the casing 20 through the openings 40 and 42.

The openings 44, 46 are disposed so that the upper sides thereof have the same height. In the row of the openings 44 and 46, the openings 44 are disposed between the openings 46. The length of the opening 46 in the up and down directions is greater than the length of the opening 44 in the up and down directions. The hook members 38 of the thick plate 28 project externally or outwardly of the casing 20 through the openings 44 and 46.

Note that the lower portion 26a of the thick plate 26 is bent preferably at an angle of 20 to 70 degrees, and particularly preferably at an angle of 30 to 60 degrees, for example, at an angle of about 45 degrees. The lower portion 26a extends externally of the casing 20 through a slit (slender opening) 50 of the side surface of the casing 20.

The side surface of the casing 20, which extends in the vehicle width direction and is located on the side of the seat, has a bent section 52 which extends externally below the slit 50 to have an approximately V-shaped cross section, and the lower portion 26a of the thick plate is overlapped with an upper surface 52a of the bent section 52 and spot welded thereto at 2 to 4 positions. A lower portion 52b of the bent section 52 is bent outwardly approximately perpendicularly from the side surface of the casing 20.

The lid 24 has a pair of leg sections 56 and 58, and openings 60 and 62 are formed in the respective leg sections 56 and 58. The hook members 36 and 38 are engaged with the openings 60 and 62 so that the lid 24 is locked to the casing 20.

In the airbag apparatus arranged as described above, when the inflator 30 is actuated to supply a gas, the airbag 22 is deployed and the lid 24 is broken and opened along the thin wall portion 24a, whereby the airbag 22 is deployed in a compartment. During the deployment, a pressure is exerted on the thick plates 26 and 28 and the casing 20 from the airbag 22 to expand the casing 20. However, since the thick plates 26 and 28 are disposed in the casing 20 and the pressure of the airbag 22 is resisted by the thick plates 26 and 28, the expansion of the casing 20 is prevented.

Further, when the airbag 22 is deployed, while a force for moving the lid 24 upward in FIG. 4 is exerted from the airbag 22 to the lid 24, the force is resisted by the leg sections 56 and 58 and the thick plates 26 and 28. Since the hook members 36 and 38 of the thick plates 26 and 28 project externally of the casing 20 through the openings 40, 42, 44 and 46, the upward drawing force exerted on the thick plates 26 and 28 is transmitted to the casing 20 not only through the portions where the thick plates 26 and 28 are spot welded to the casing 20 but also through the portions where the upper sides of the openings 40, 42, 44, 46 abut against the hook members 36 and 38. As a result, since the upward drawing force is widely dispersed and transmitted to the casing 20, the deformation of the casing 20 caused by the upward drawing force also can be prevented.

When a passenger hits the airbag apparatus installed in the instrument panel, the casing 20 is deformed in a manner such that the side surface of the casing 20, which extends in the vehicle width direction and is located on the side of the seat, projects outwardly as shown by the two-dot-and-dash lines 20', 26' and 52' in FIG. 7. In this case, the thick plate 26 itself is not deformed significantly because it has a high rigidity. Therefore, the lower portion 26a moves externally and the overall thick plate 26 is moved downward. As the lower portion 26a of the thick plate 26 projects externally, the approximately V-shaped bent section 52 is crushed flat as shown by the reference numeral 52', and the flat surface of the casing 20 is bent as shown by reference numeral 20'. When the side surface of the casing 20 is bent as shown by reference numeral 20', an energy or load applied to the passenger is absorbed.

In the embodiment, a large number of through holes 66 is formed in the casing 20 so that a larger amount of energy applied to the instrument panel or lid (energy/load applied to the passenger when the passenger hits the instrument panel) can be absorbed. Further, in the embodiment, the lengths of the openings 42 and 46 in the vertical direction are made larger than those of the openings 40, 42, and this arrangement also intends to absorb a larger amount of energy applied to the instrument panel.

That is, when a passenger hits approximately the central portion of the lid 24 as shown by an arrow F in FIG. 5, the central portion of the lid 24 is dented in the direction of the arrow F, and the side surfaces of the casing 20 are also deformed in accordance with deformation of the side surfaces, so that the energy from the instrument panel or lid is absorbed. At that time, however, both ends of the casing 20 tend to move upward. Since the openings 40 and 42 at both ends extend long downwardly as shown in FIGS. 1, 2 and 6, when both sides of the casing 20 are pulled upwardly, both sides of the casing 20 are not subjected to restriction of the thick plates 26 and 28. Therefore, the casing 20 is deformed smoothly and the larger amount of the energy from the instrument panel or casing is absorbed.

Incidentally, though it is not shown, a slit or a slender notch, which extends in the up and down directions, may be formed in the upper surface 52a of the bent section 52 so that the bent section 52 can be deformed easily.

Figure 8:
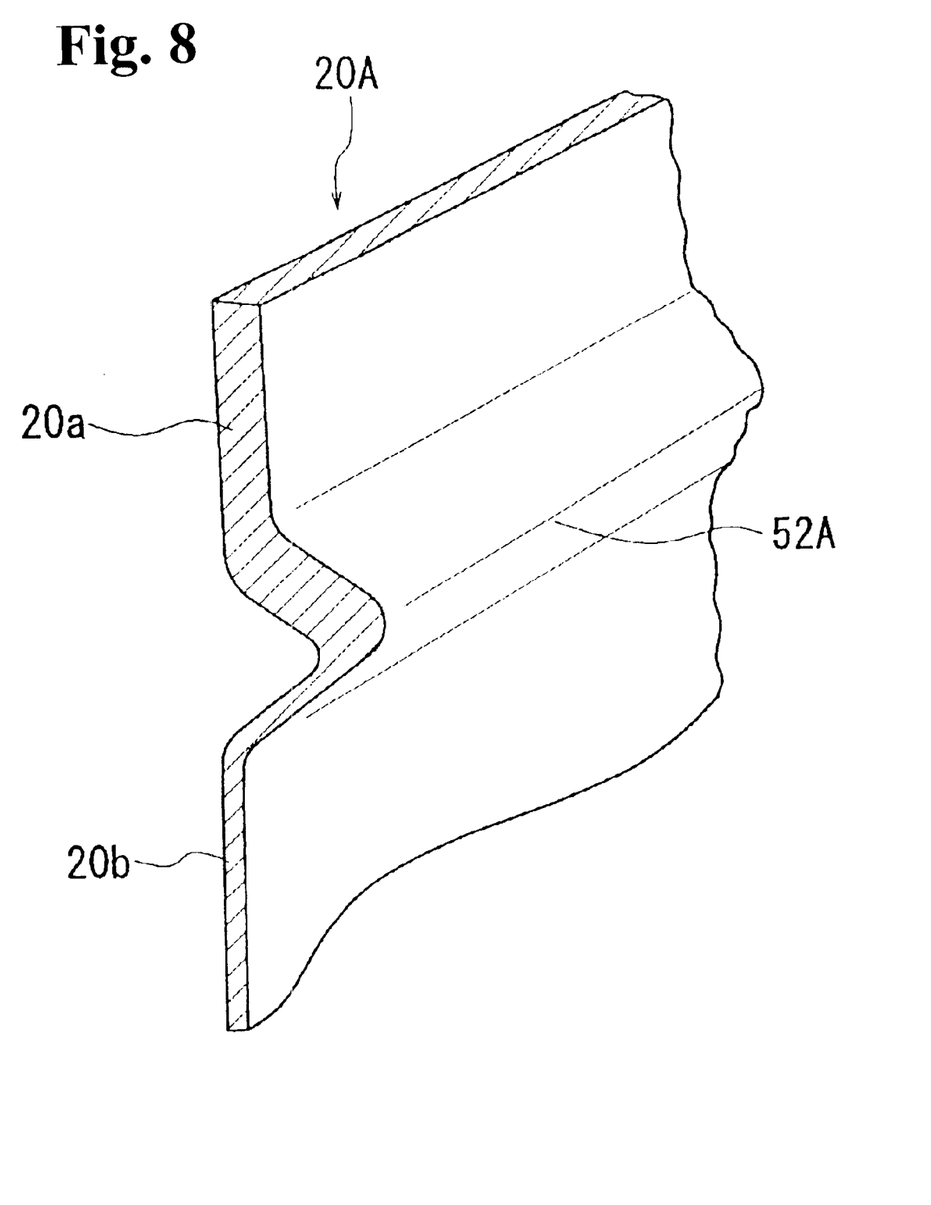
FIG. 8 is a sectional perspective view showing another embodiment.

In the embodiment, although the thick plates 26 and 28, which are arranged separately from the casing 20, are secured to the casing 20 by spot welding or the like, a thick plate section 20a may be formed integrally with a casing 20A, as shown in FIG. 8. That is, it may be successively and integrally formed from the thick plate section 20a to a thin plate section 20b. In this case, it is preferable to form a bent section 52A by bending the lower portion of the thick plate section 20a and the upper portion of the thin plate section 20b externally so that the boundary therebetween is most protruded.

In the present invention, the casing is composed of metal, a synthetic resin or the like.

As described above, according to the present invention, there is provided the airbag apparatus in which the casing is less deformed when the airbag is deployed. The casing of the airbag apparatus can be easily manufactured because the casing can be made by using the less number of joint positions, such as spot-welded positions and the like.

While the invention has been explained with reference to the specific embodiments of the invention, the explanation is illustrative and the invention is limited only by the appended claims.

What is claimed is:

1. An airbag apparatus comprising:

a casing having an opening at an upper part thereof and one side portion, an airbag accommodated in and coupled with the casing, a gas generator for supplying a gas into the airbag and deploying the airbag, a lid for covering the opening, and a thick plate having a thickness greater than that of the casing, and including an upper portion and a lower portion extending obliquely downwardly from the upper portion and secured to the one side portion of the casing, said lower portion and the one side portion of the casing secured thereto projecting outwardly of the casing to be deformed easily when a force is applied thereto.

2. An airbag apparatus according to claim 1, wherein the one side portion of the casing is arranged to be located near a seat.

3. An airbag apparatus according to claim 2, wherein said casing includes a lateral slit through which the lower portion of the thick plate extends outside of the casing, said upper portion of the thick plate being located inside the casing.

4. An airbag apparatus according to claim 3, further comprising a second thick plate attached to the casing at a side opposite to the thick plate with the upper and lower portions.

5. An airbag apparatus comprising:

an airbag, a gas generator for supplying a gas into the airbag and deploying the airbag, a casing for retaining the airbag, said casing including an upper opening, an upper side portion near the upper opening to form a thick portion and having an upper section and a lower section extending obliquely downwardly from the upper section, and a lower side portion situated under the upper side portion and having a thickness less than that of the upper side portion, said lower section and a portion of the lower side portion continuous to the lower section projecting outwardly of the casing to be deformed easily when a force is applied thereto, and a lid disposed above the casing for covering the upper opening.

6. An airbag apparatus according to claim 5, wherein said upper and lower side portions are arranged to be located near a seat.

7. A casing of an airbag apparatus for accommodating an airbag, comprising:

a main portion having an upper opening and one side portion for defining a part of the upper opening, and a thick plate disposed on the one side portion along the upper opening and having a thickness greater than that of the main portion, said thick plate having an upper portion and a lower portion secured to the one side portion of the main portion and extending obliquely downwardly from the upper portion, said lower portion of the thick plate and a portion of the one side portion of the main portion secured to the lower portion projecting outwardly to be deformed easily when an external force is applied thereto.

8. A casing of an airbag apparatus for accommodating an airbag, comprising:

an upper opening, one upper side portion near the upper opening for forming a thick portion and having an upper section and a lower section extending obliquely downwardly from the upper section, and a lower side portion situated under the one upper side portion and having a thickness less than that of the one upper side portion, said lower section and a portion of the lower side portion continuous to the lower section projecting outwardly of the casing to be deformed easily when a force is applied thereto.

9. A casing according to claim 7, wherein said main portion includes a lateral slit through which the lower portion of the thick plate extends outside of the casing, said upper portion of the thick plate being located inside the main portion.

10. A casing according to claim 9, further comprising a second thick plate attached to the main portion at a side opposite to the thick plate with the upper and lower portions.

* * * * *